US011427337B2

(12) United States Patent
Saini et al.

(10) Patent No.: US 11,427,337 B2
(45) Date of Patent: Aug. 30, 2022

(54) RADIAL SLIT DISC ENERGY ATTENUATION SYSTEM

(71) Applicant: Goodrich Corporation, Charlotte, NC (US)

(72) Inventors: Mohinder Saini, Karnataka (IN); Srijith Purushothaman, Karnataka (IN); Krishnakumar Vadakkedathu Jathavedan, Kerala (IN)

(73) Assignee: GOODRICH CORPORATION, Charlotte, NC (US)

( * ) Notice: Subject to any disclaimer, the term of this patent is extended or adjusted under 35 U.S.C. 154(b) by 713 days.

(21) Appl. No.: 16/402,443

(22) Filed: May 3, 2019

(65) Prior Publication Data
US 2020/0239147 A1    Jul. 30, 2020

(30) Foreign Application Priority Data

Jan. 30, 2019  (IN) .............................. 201911003723

(51) Int. Cl.
*B64D 25/04* (2006.01)
*B60N 2/005* (2006.01)
*F16F 7/12* (2006.01)

(52) U.S. Cl.
CPC ............. *B64D 25/04* (2013.01); *B60N 2/005* (2013.01); *F16F 7/12* (2013.01)

(58) Field of Classification Search
CPC .. B64D 25/04; B60N 2/005; F16F 7/12; F16F 7/125; F16F 7/003; F16F 7/09
See application file for complete search history.

(56) References Cited

U.S. PATENT DOCUMENTS

| 2,776,695 | A | * | 1/1957 | Wells | F16F 7/12 |
| | | | | | 73/833 |
| 3,059,727 | A | | 10/1962 | Fuchs | |
| 3,671,068 | A | * | 6/1972 | Gerhard | B60R 19/34 |
| | | | | | 293/30 |
| 4,150,805 | A | | 4/1979 | Mazelsky | |
| 4,718,296 | A | | 1/1988 | Hyodo | |
| 6,220,410 | B1 | | 4/2001 | Robinson | |

FOREIGN PATENT DOCUMENTS

| KR | 20120039301 A | 4/2012 | |
| KR | 20130084456 A * | 7/2013 | |
| KR | 20130084456 A | 7/2013 | |
| WO | 9716655 A2 | 5/1997 | |
| WO | 2013090744 A1 | 6/2013 | |
| WO | WO-2013090744 A1 * | 6/2013 | ............... B60N 2/24 |

OTHER PUBLICATIONS

European Search Report for European Application No. 20154625.6; Application Filing Date Jan. 30, 2020; dated Jun. 4, 2020 (7 pages).

* cited by examiner

*Primary Examiner* — Justin M Benedik
(74) *Attorney, Agent, or Firm* — Cantor Colburn LLP (57) ABSTRACT

A vehicle including a housing, and a vehicle seat disposed in the housing. The vehicle further includes at least one radial slit disc energy attenuation assembly having an upper end coupled to the vehicle seat and a lower end coupled the housing. The radial slit disc energy attenuation assembly includes a slit disc stack having a plurality of deflectable discs configured to deflect in response to realizing a force applied by the vehicle seat.

16 Claims, 11 Drawing Sheets

FIG. 14

RADIAL SLIT DISC ENERGY ATTENUATION SYSTEM

CROSS-REFERENCE TO RELATED APPLICATIONS

This application claims the benefit of Indian Application No. 201911003723 filed Jan. 30, 2019, which is incorporated herein by reference in its entirety.

BACKGROUND

The following description relates to aircraft vehicles and, more particularly, to an aircraft energy attenuation system.

Aircraft vehicles currently employ fixed profile energy attenuation systems to absorb high-energy forces during crash scenarios. Fixed profile energy attenuation systems have employed wire bending actions, for example, to provide for a variation in load with stroke to achieve energy attenuation capabilities. Wire bending mechanisms use forces required to bend a metallic wire, which has a rectangular and varying cross section, and to draw it through offset rollers to provide for the load variation.

BRIEF DESCRIPTION

According to a non-limiting embodiment, a vehicle includes a housing, and a vehicle seat disposed in the housing. The vehicle further includes at least one radial slit disc energy attenuation assembly having an upper end coupled to the vehicle seat and a lower end coupled the housing. The radial slit disc energy attenuation assembly includes a slit disc stack having a plurality of deflectable discs configured to deflect in response to realizing a force applied by the vehicle seat.

According to another non-limiting embodiment, a radial slit disc energy attenuation system comprises a slit disc stack extending along a central axis (A) from a lower stack end to an upper stack end to define a stack height. The slit disc stack includes a plurality of slit discs and a plurality of spacer discs. The plurality of slit discs and the plurality of spacer discs are vertically stacked in an alternating arrangement with respect to one another. A plunger extends from an upper end to a lower end. The lower end is positioned proximate to the upper stack end and is configured to penetrate the slit disc stack in response to receiving an applied force. In response to penetrating the slit disc stack, energy is transferred to at least one deflected slit disc and is dissipated within the slit disc stack.

According to yet another non-limiting embodiment, a method of dissipating energy comprises stacking a plurality of slit discs and spacer discs in an alternating arrangement along a central axis (A) from a lower stack end to an upper stack end to define a slit disc stack. The method further comprises positioning a plunger at the upper stack end during a non-actuated position, applying a force to the plunger in response to collapsing the cyclic disc-deformation structure, and transferring energy delivered from the plunger to the slit disc stack so as to dissipate the energy.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

These and other advantages and features will become more apparent from the following description taken in conjunction with the drawings.

DETAILED DESCRIPTION

As will be described below, an energy attenuation system is provided which utilizes cyclic bending and unbending (i.e., alternating deflection and undeflection) of a stacked arrangement of slit discs using a plunger having a vertical arrangement of grooves. During crash scenarios, plunger strokes through the stacked slit discs by plastically deforming them. The gap between the slit discs and corresponding grooves on the plunger allows the bending and unbending of slit discs to dissipate the energy. This cyclic deformation of each sector of the slit disc helps in dissipating most of the energy in the form of internal energy. The kinetic energy of the plunger gets converted in to strain energy and frictional interface energy, thereby attenuating the force realized during a crash scenario.

Figure 1A:
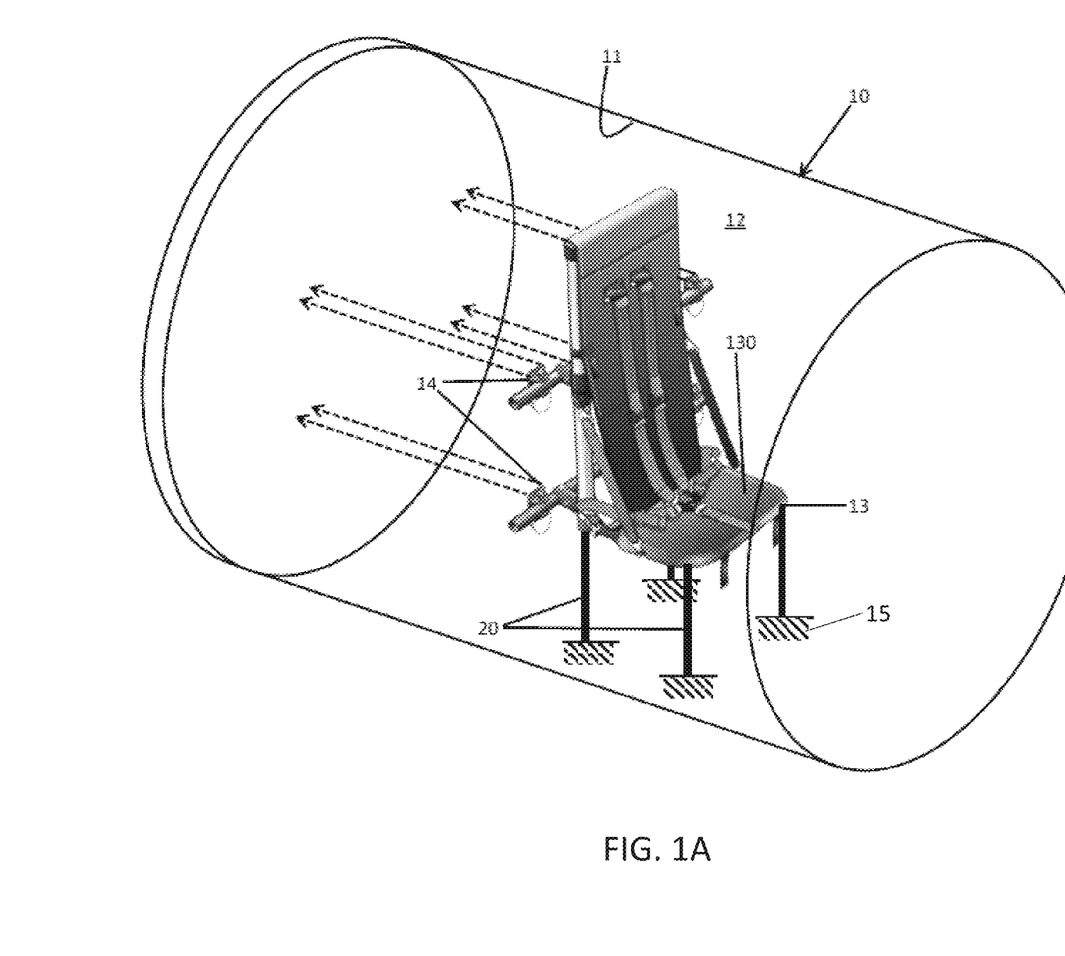
FIG. 1A is a perspective view of an energy attenuation system installed in an aircraft vehicle according to a non-limiting embodiment.

With reference to FIG. 1A, an energy attenuation system 10 is provided for use in an aircraft, such as a helicopter, for example. The energy attenuation system 10 includes a housing 11, which is formed to define an interior 12 that may be provided as a cockpit or a cabin that can accommodate one or more occupants or operators and, in some cases, one or more passengers. The energy attenuation system 10 further includes a vehicle seat 13, which may include a seat pan 130 or another suitable feature on which an occupant, operator or passenger can sit, and rivets 14. The rivets 14 are disposed to support the seat 13 within the interior 12 of the housing 11. The rivets 14 are designed to survive a certain gravitational loading incident, such as when an occupant's body accelerates downwardly into the seat pan 130 of the seat 13 up to about 13 to about 14.5 Gs (i.e., 13-14.5 times the acceleration of gravity). The energy attenuation system 10 also includes at least one cyclic disc-deformation structure 20. The cyclic disc-deformation structure 20 includes an upper end coupled to the seat 13 and a lower end coupled to a base 15 of the housing 11. The at least one cyclic disc-deformation structure 20 is a single use feature and is configured to deformably support and decelerate the seat 13 within the interior 12 of the housing 11 following failures of the rivets 14.

That is, when the occupant's body accelerates downwardly into the seat pan 130 of vehicle seat 13 with an acceleration that is greater than about 13-14.5 Gs, the rivets 14 fail due to shearing and the seat 13 begins to accelerate toward the housing 11. The at least one cyclic disc-deformation structure 20 acts to alternately deform (i.e. bend and unbend) a stacked arrangement of discs to remove or attenuate the energy and slow the acceleration of the seat 13. In accordance with embodiments and, as will be described below, the at least one cyclic disc-deformation structure 20 may be configured to collapse at successive longitudinal portions in response to correspondingly successive compressive forces applied by the vehicle seat 13 following the failures of the rivets 14.

Figure 2:
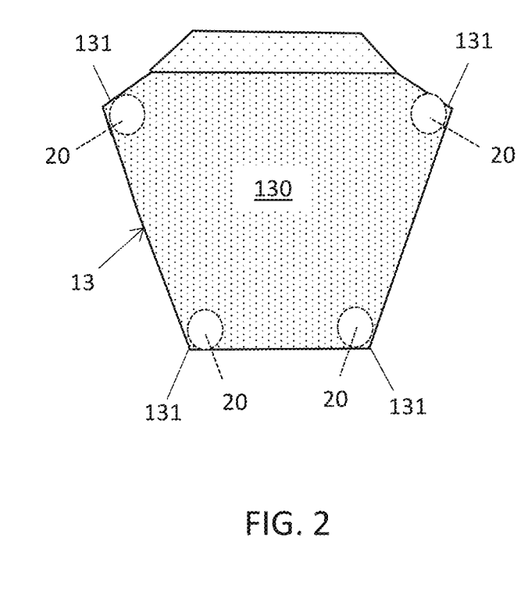
FIG. 2 is a top-down view of a vehicle seat according to a non-limiting embodiment.

With reference to FIG. 2, a vehicle seat 13 coupled to one or more cyclic disc-deformation structures 20 of the energy attenuation system 10 is illustrated according to a non-limiting embodiment. The cyclic disc-deformation structures 20 can be coupled to the seat 13 (e.g., a corner 131 of a bottom portion of a seat pan 130). In cases where multiple cyclic disc-deformation structures 20 are employed, the orientations of each of the cyclic disc-deformation structures 20 is substantially uniform and each cyclic disc-deformation structure 20 bears a substantially equal amount of weight of the seat 13. As such, the deformable collapse of each cyclic disc-deformation structure 20 is consistent and the seat 13 remains in an original orientation as its energy is attenuated (i.e., the seat 13 does not tilt or, roll or fall over).

Figure 1B:
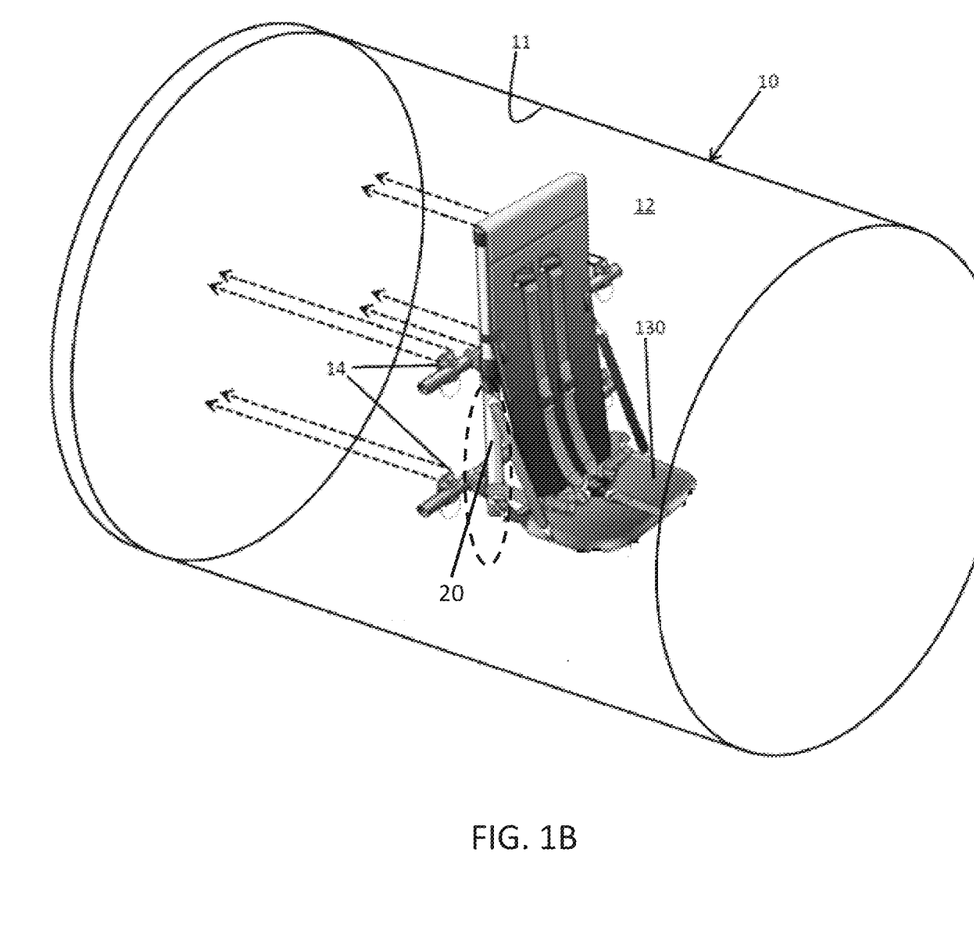
FIG. 1B is a perspective view of an energy attenuation system installed in an aircraft vehicle according to another non-limiting embodiment

According to another non-limiting embodiment illustrated in FIG. 1B, the vehicle seat 13 can be wall mounted similar to the seat 13 illustrated in FIG. 1A, but without the cyclic disc-deformation structures 20 serving as leg supports. Instead, the seat pan 130 can include be foldable via a hinge joint with respect to a seat back that includes the backrest tubes. Accordingly, cyclic disc-deformation structures 20 can be installed at the bottom half of the backrest tubes installed on the back of the seat 13. In at least one embodiment, the cyclic disc-deformation structures 20 can span from the seat pan 130 to top of the backrest of the seat 13. The cyclic disc-deformation structures 20 can be mounted alongside the bottom half of a respective backrest tube with a rivet at its top. When the rivet fails at a set load (e.g., a set G-force), the cyclic disc-deformation structures 20 is activated so as to dissipates the energy as described in greater detail below.

Figure 3:
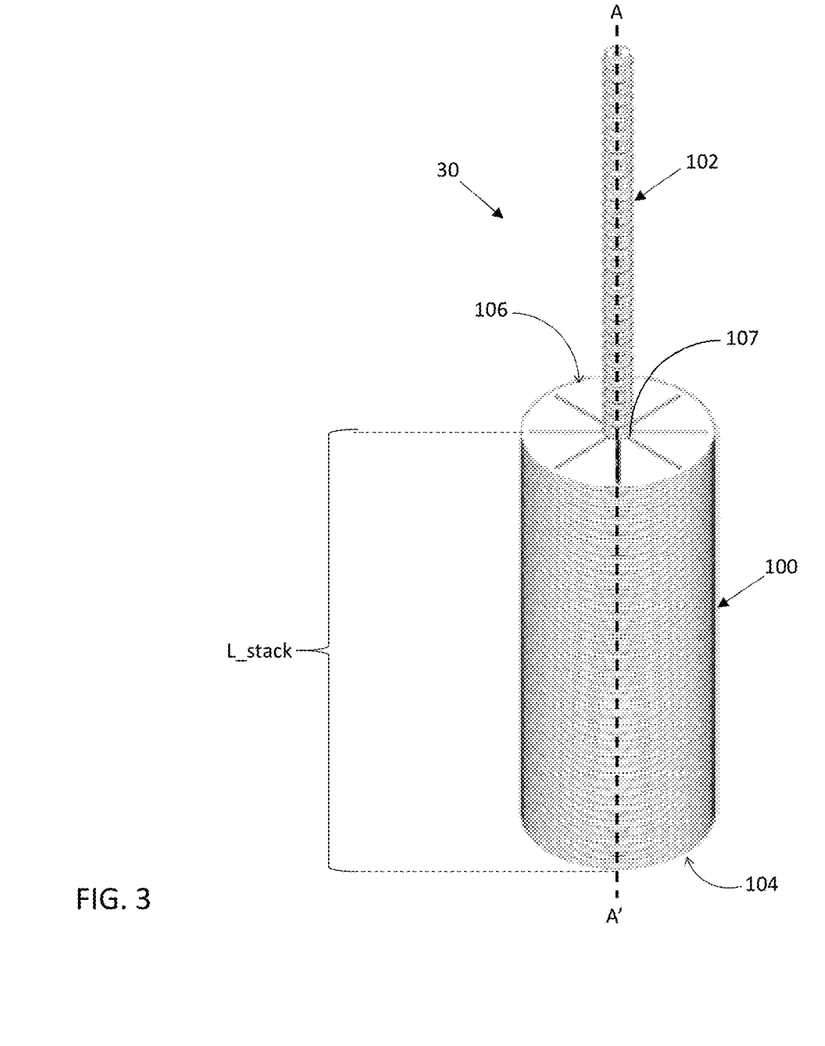
FIG. 3 is a perspective view of a radial slit disc energy attenuation assembly according a non-limiting embodiment.

Turning now to FIG. 3, a radial slit disc energy attenuation assembly 30 is illustrated according to a non-limiting embodiment. The radial slit disc energy attenuation assembly 30 includes a slit disc stack 100 and a plunger 102. The slit disc stack 100 extends along a central axis (A) from a lower stack end 104 to an upper stack end 106. The distance between the lower stack end 104 and the upper stack end 106 defines a length (L_stack) of the slit disc stack 100. The slit disc stack 100 includes a central bore 107, which extends from the upper stack end 106 to the lower stack end 104 and is configured to receive the plunger 102. In response to penetrating into the central bore 7, energy is transferred from the plunger 102 to the slit disc stack 100 and is dissipated therein as described in greater detail below.

Figure 4:
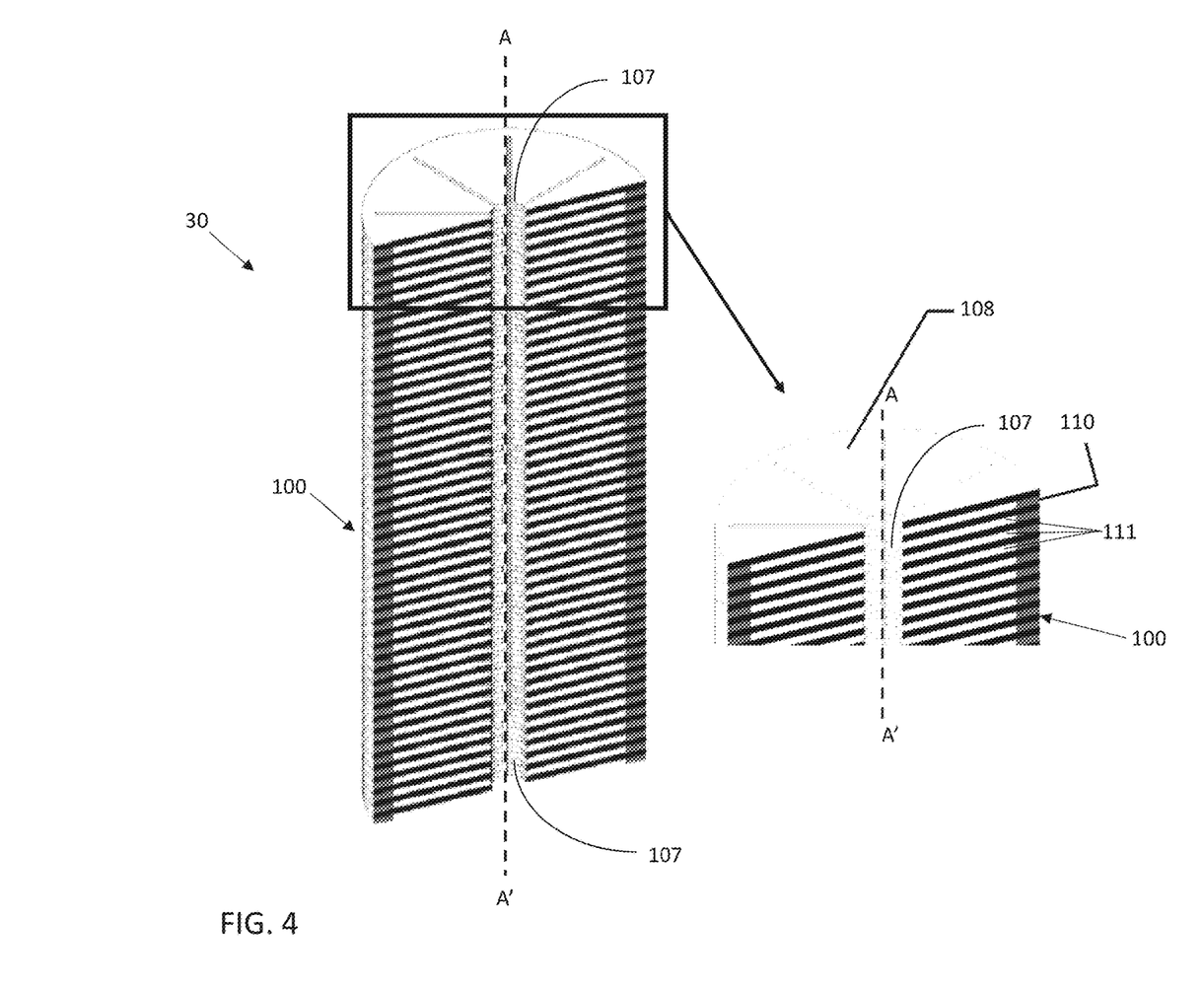
FIG. 4 is a cross-sectional view of a slit disc stack included in the radial slit disc energy attenuation assembly according to a non-limiting embodiment.

Referring to FIG. 4, the slit disc stack 100 includes a plurality of slit discs 108 and a plurality of spacer discs 110. The plurality of slit discs 108 and the plurality of spacer discs 110 are formed from a flexible material and are vertically stacked along the central axis (A) in an alternating arrangement with respect to one another. In some examples, the slit discs 108 and the spacer discs 110 can be formed from 304 stainless steel, which can be flexed and deflected in response to receiving an applied forced, e.g., from the plunger 102.

In at least one non-limiting embodiment, an individual spacer disc 110 is interposed directly between each opposing pairs of slit discs 108 included in the slit disc stack 100 to define a gap 111 between the pair of opposing slit discs 108. The gaps 111 are configured to promote obstructed-free deflection when deflecting (e.g., bending and unbending) of the slit discs 108. The distance between proximate slit discs 108 defined by the gaps 111 effectively controls the flexibility of the slit disc stack 100, and in turn controls the stroke length of the plunger 102 when transitioning from a non-actuated position to an actuated position as described in greater detail below.

Figure 5:
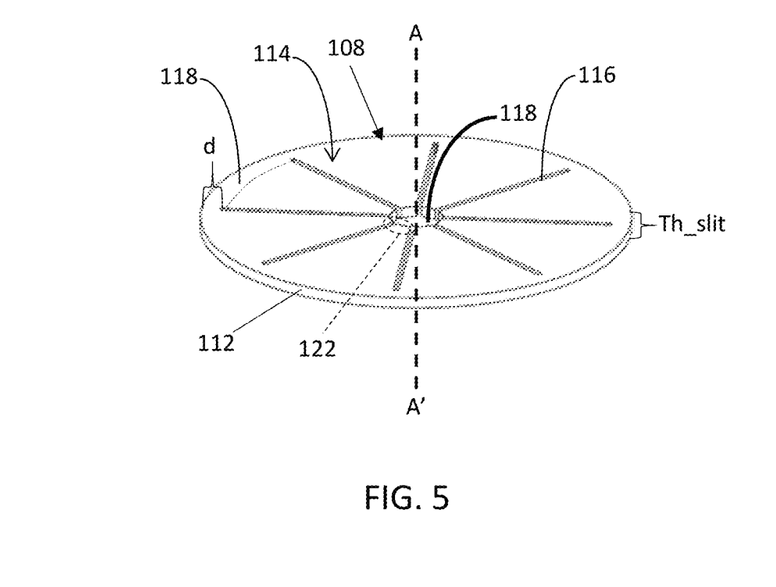
FIG. 5 is a perspective view of a slit disc included in the slit disc stack of FIG. 4 according to a non-limiting embodiment.
Figure 6:
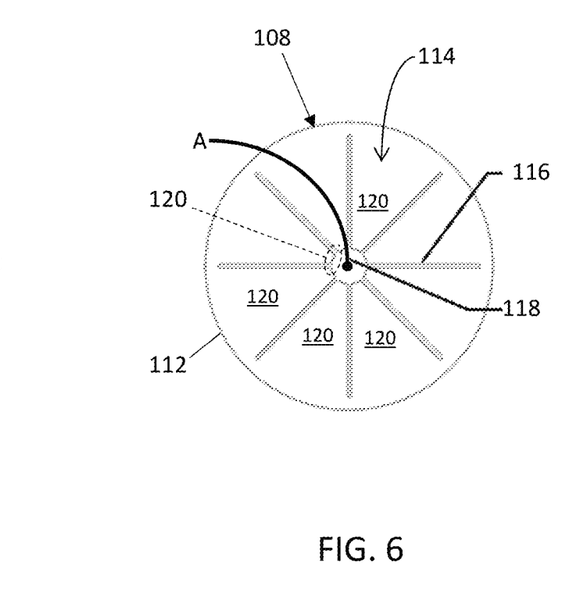
FIG. 6 is a top view of the slit disc shown in FIG. 5 according to a non-limiting embodiment.

Turning to FIGS. 5 and 6, a slit disc 108 included in the slit disc stack 100 is illustrated according to a non-limiting embodiment. Each slit disc 108 has an outer edge 112 that extends circumferentially about the central axis (A) to define a slit disc body 114. Each slit disc 108 includes a plurality of slits 116 extending radially from a central opening 118 toward the outer edge 112. In at least one non-limiting embodiment, the slits 116 terminate a distance (d) from the outer edge 112. Accordingly, the distance (d) between the outer edge 112 and each slit 116 defines a closed-end portion 118. The plurality of slits 116 also define individual flexible sectors 120 configured to operate as a cantilever. The flexible sectors 120 have bendable ends 122 located proximate to the central opening 118, and are configured to bend in response to an applied forced.

Figure 7:
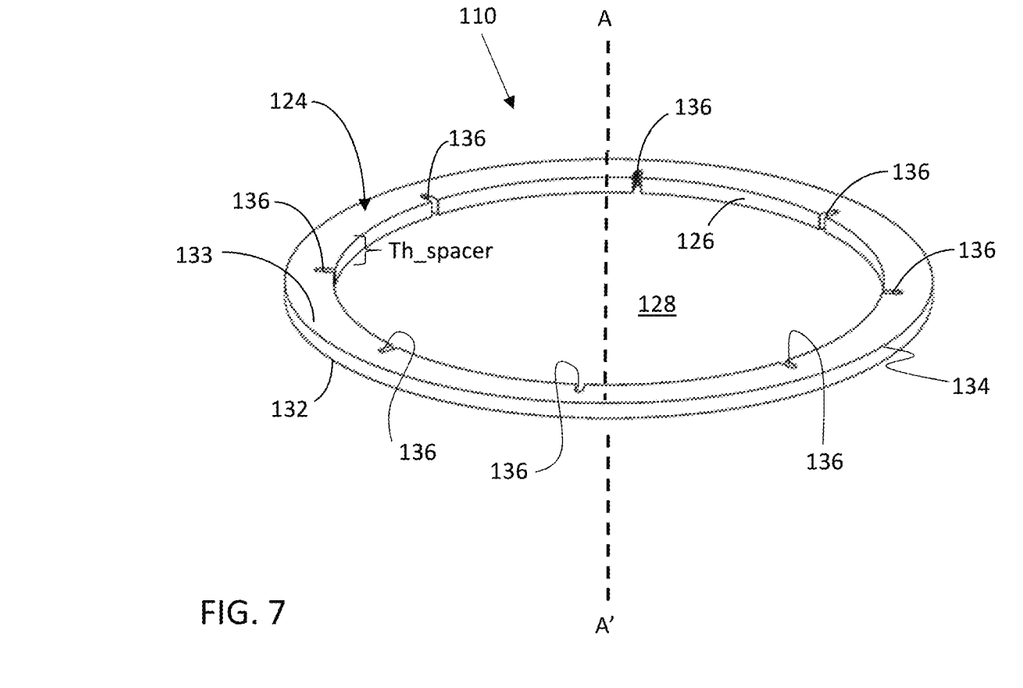
FIG. 7 is a perspective view of a spacer disc included in the slit disc stack of FIG. 4 according to a non-limiting embodiment.

Referring to FIG. 7, a spacer disc 110 is illustrated according to a non-limiting embodiment. Each spacer disc 110 included in the slit disc stack 100 has a annular-shaped body 124 that extends circumferentially about the central axis (A) to define an inner wall 126 that surrounds an inner void 128. The annular-shaped body 124 has an upper surface 133 and a lower surface 132 extending from the inner wall 126 to an outer wall 134 to define a body width. The inner wall 126 and the outer wall 134 extend from the upper surface 133 to the lower surface 132 to define a body thickness, In at least one non-limiting embodiment, the inner wall 126 includes a plurality of notches 136 formed therein to promote flexibility of the annular-shaped body 124. The notches 136 can be aligned with the slits 116 of the slit discs 108 to promote the flexibility of the slit disc stack 100.

When arranging the slit disc stack 100, the thickness (Th_slit) of the slit discs 108 and/or the thickness (Th_spacer) of spacer discs 110 can be varied. In this manner, the overall stiffness along the length (L_stack) of a slit disc stack 100 can be set. The varying stiffness can assist in achieving variable energy absorption of various occupants ranging from those in the 5th percentile occupant size to those in the 95th percentile.

Figure 8:
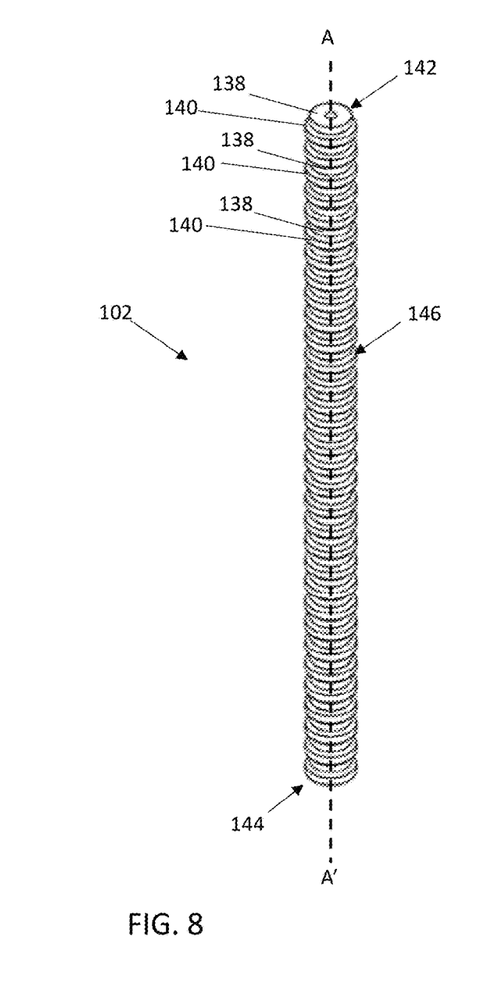
FIG. 8 is a perspective view of a plunger included in the radial slit disc energy attenuation assembly according to a non-limiting embodiment.
Figure 9:
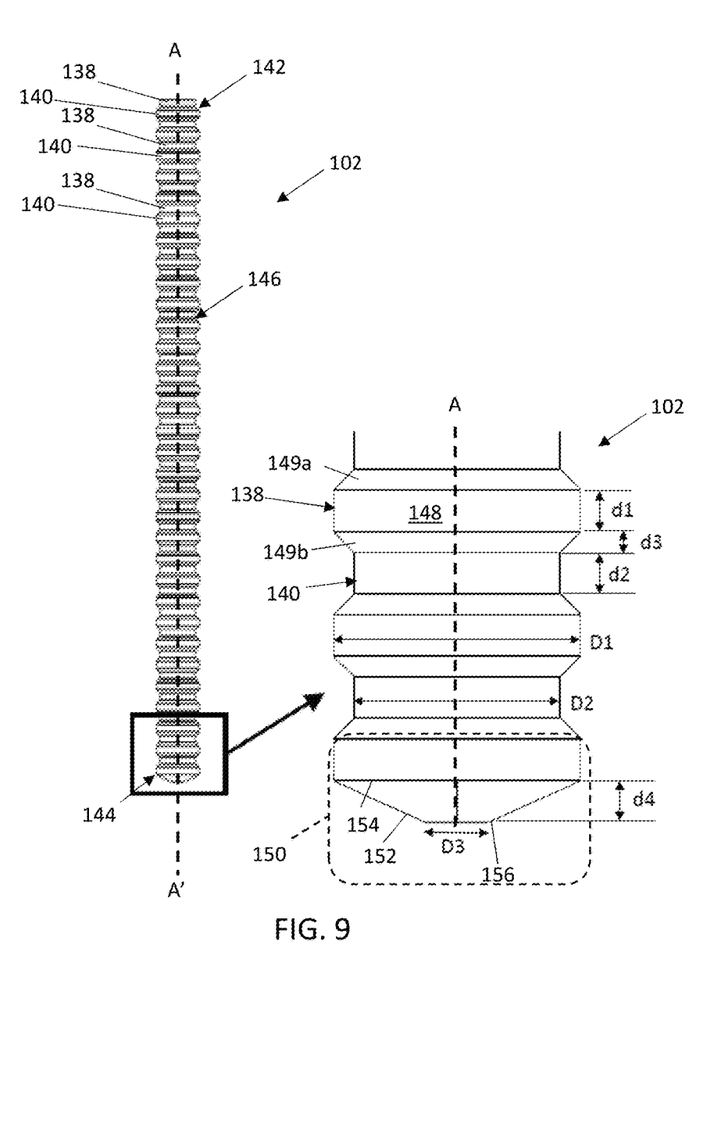
FIG. 9 is a close-up view of a lower guide portion of the plunger shown in FIG. 8 according to a non-limiting embodiment.

Turning now to FIGS. 8 and 9, a plunger 102 included in a radial slit disc energy attenuation assembly 30 (see FIG. 3) is illustrated according to a non-limiting embodiment. The plunger 102 includes an alternating series of ridges 138 and furrows 140 extending parallel to the central axis (A) from an upper end 142 to a lower end 144 to define a corrugated body 146. The alternating series of ridges 138 and furrows 140 produces a series of entries and exits through one or more slit discs 108 as the plunger 102 strokes through into the slit disc stack 100. In this manner, the force applied to the slit discs 108 can be pulsated or modulated so to improve the efficiency at which the energy is dissipated in the deflected slit discs 108.

The plunger can be formed from a rigid material such as, for example, aluminum.

Each furrow 140 extends between a first side of the body 146 and an opposing second side of the body 146 in a direction perpendicular to the central axis (A) to define a furrow diameter (D2), and extends between at least one pair of ridges 138 in a direction parallel to the central axis (A) to define a furrow width (d2).

Each ridge 138 includes a middle portion 148 directly interposed between an upper slanted portion 149a and a lower slanted portion 149b. The middle portion 148 extends between a first side of the body 146 and an opposing second side of the body 146 to define a middle diameter (D1) that is greater than the furrow diameter (D2). The middle portion 148 also extends between the upper slanted portion 149a and the lower slanted portion 149b to define a middle width (d1). The upper slanted portion 149a and lower slanted portion 149b each extend from the middle portion 148 to a proximate furrow 140 to define a slanted portion width (d3).

The lower end 144 of the plunger 102 further includes a guide portion 150. The guide portion 150 has a tapered body including tapered sidewalls 152 extending from a base 154 to a tip 156 to define a tapered width (d4) that is greater than the middle width (d1), the furrow width (d2) and the slanted width (d3). The base 154 extends between the tapered sidewalls 152 at a distance to define a base diameter. The base diameter can substantially match the middle diameter (D1) of the ridge 138. The tip 156 extends between the tapered sidewalls 152 to define a tip diameter (D3) that is less than the base diameter, i.e., is less than D1.

Figure 10:
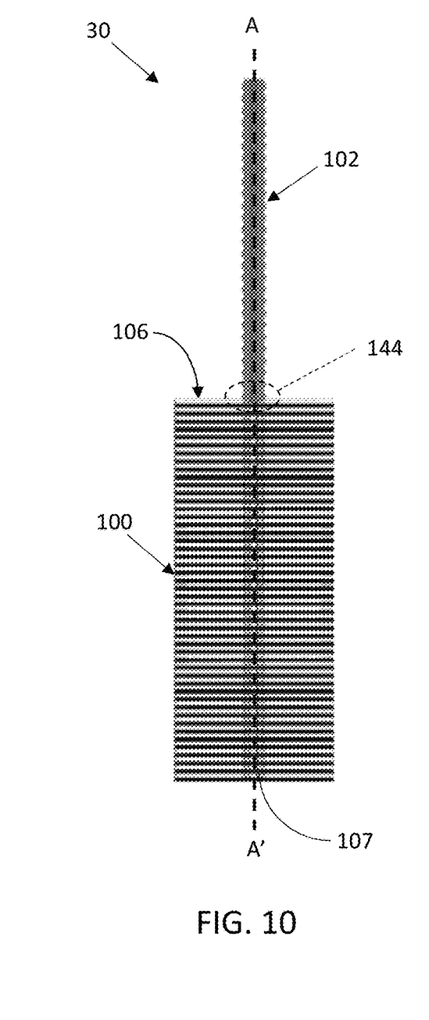
FIG. 10 is a cross-sectional view of the radial slit disc energy attenuation assembly operating in a non-crash scenario according to a non-limiting embodiment.
Figure 11:
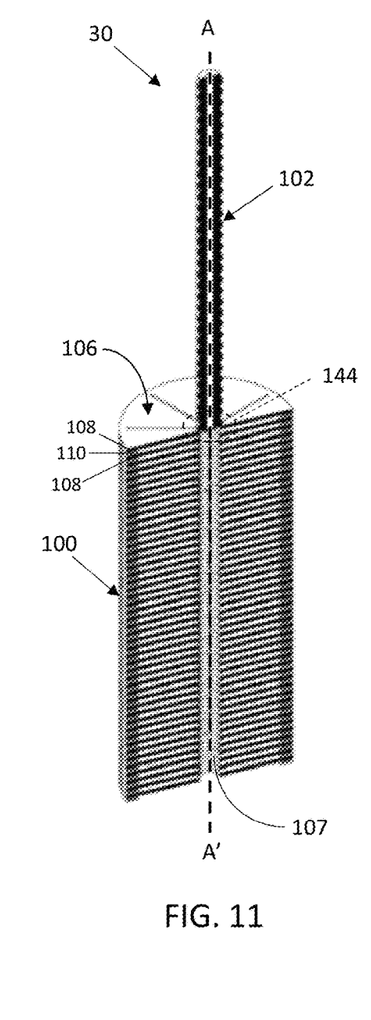
FIG. 11 is a cross-sectional view of the radial slit disc energy attenuation assembly shown in FIG. 10 according to a non-limiting embodiment.

Referring to FIGS. 10 and 11, the radial slit disc energy attenuation assembly 30 is illustrated in a non-actuated position. This non-actuated position can exist when the radial slit disc energy attenuation assembly 30 is installed on an aircraft vehicle (not shown in FIGS. 10-11) operating during a non-crash scenario. While in the non-actuated position, the plunger 102 is positioned at the upper stack end 106 of the slit disc stack 100 such that the lower end 144 is centered with respect to the central bore 107. Because the plunger 102 does not penetrate the slit disc stack 100 while in the non-actuated position, the slit discs 108 and the spacer discs 110 are not deflected.

Figure 12:
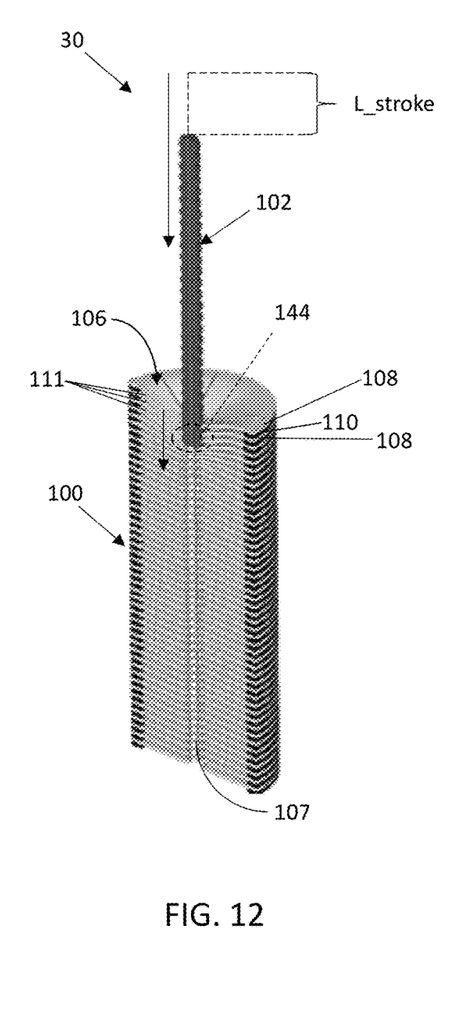
FIG. 12 is a cross-sectional view of the radial slit disc energy attenuation assembly operating in a crash scenario according to a non-limiting embodiment.
Figure 13:
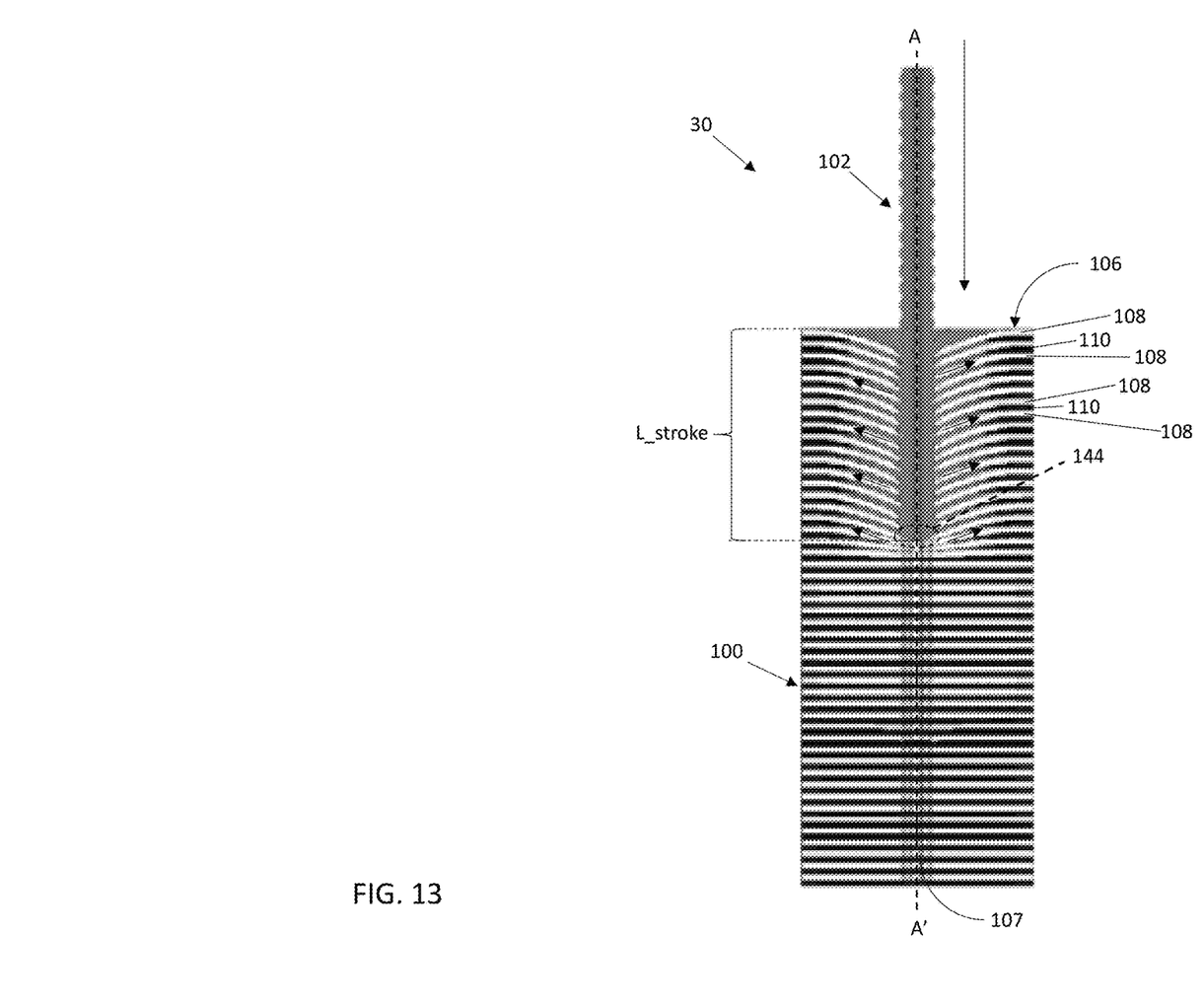
FIG. 13 is a side view of the radial slit disc energy attenuation assembly operating in a crash scenario illustrating the resulting energy transfer according to a non-limiting embodiment.

Turning now to FIGS. 12 and 13, the slit disc energy attenuation assembly 30 is illustrated in an actuated position. The actuated position can be invoked when the radial slit disc energy attenuation assembly 30 is installed on an aircraft vehicle undergoing a crash scenario. During crash scenarios, the plunger 102 is displaced, i.e., "strokes" downward (as indicated by the downward arrow) through the slit disc stack 100 via the central bore 107. In at least one embodiment, structural dimensions of the 30 are set so that a stroke length (L_stroke) of about 3.65 inches (about 9.4 centimeters) is achieved in response to invoking the actuated position. Accordingly, the plunger 102 contacts one or more slit discs 108, thereby deflecting the flexible sectors 120 into the space defined by the gaps 111. The cyclic deformation of each sector 120 dissipates energy transferred from the plunger 102 in the form of internal energy. In other words, the kinetic energy of the plunger 102 is converted into strain energy and frictional interface energy transferred to the deflected slit discs 108.

The crash scenario initiates a deformation of the slit disc stack 100 starting from the 106 and kinetic energy from the downward fore (indicated by the downward arrow) of the plunger 102 is absorbed by the slit discs 108 and spacer discs 110 through plastic deformation. The absorbed energy can then be spread toward the outer edges of the (as indicated by the outward arrows) of the stack 100, and dissipated. As such, a stroke length (L_stroke) of the radial slit disc energy attenuation assembly 30 may be is significantly reduced (e.g., to below 2.0 inches, i.e., about 5.7 centimeters) compared to current wire bender type energy absorption devices that tend to have stroke lengths on the order of about 8 inches (i.e., about 20.3 centimeters). Correspondingly, a weight of the cyclic disc-deformation structure 20 may be reduced to about 0.35 pounds (lbs) (i.e., about 0.16 kilograms) as compared to 1.38 lbs (i.e., about 0.63 kilograms) provided by wire bender type systems.

Figure 14:
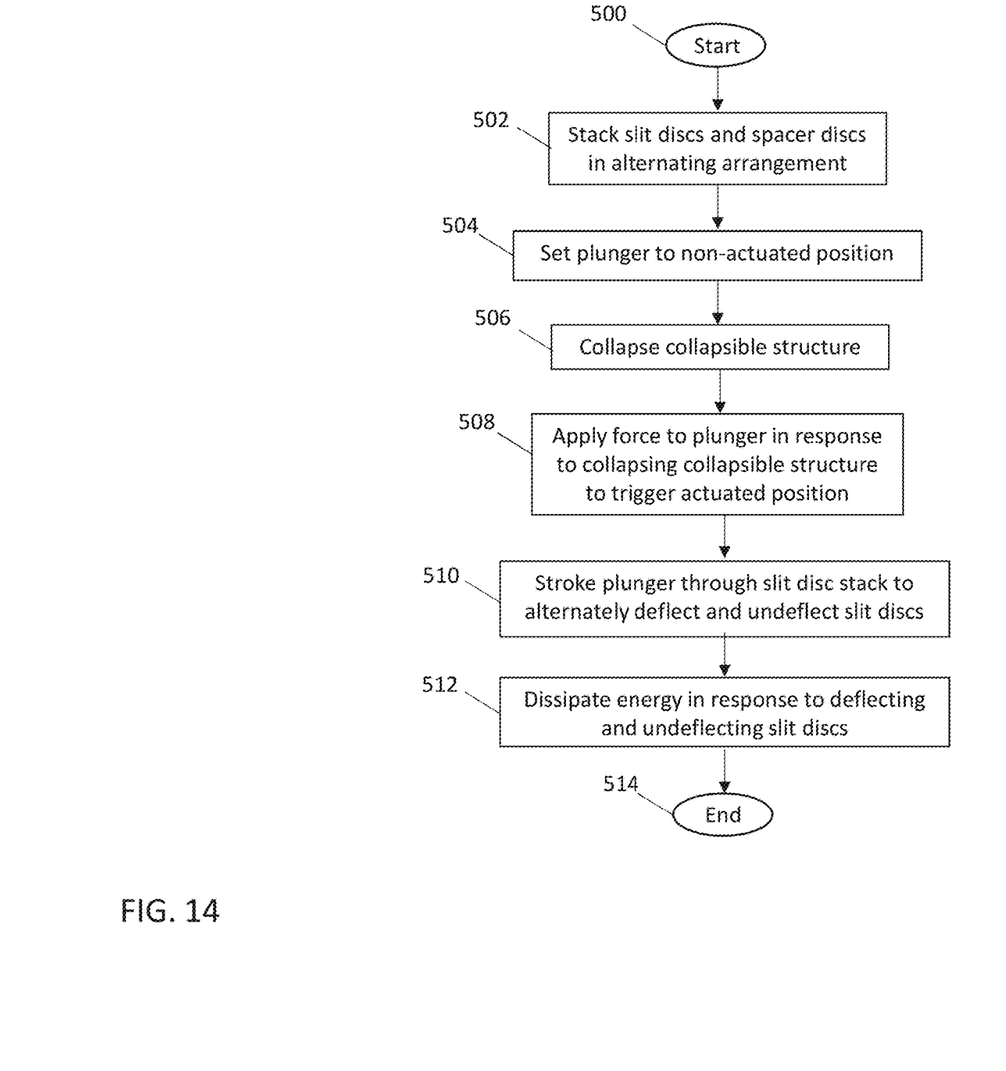
FIG. 14 is a flow diagram illustrating a method of dissipating energy using a radial slit disc energy attenuation assembly according to a non-limiting embodiment.

Turning to FIG. 14, a method of dissipating energy using a radial slit disc energy attenuation assembly is illustrated according to a non-limiting embodiment. The method begins at operation 500, and at operation 502 a plurality of slit discs and spacer discs are stacked vertically in an alternating series arrangement with respect to one another. At operation 504, a plunger is set to a non-actuated position. When in the non-actuated position, the plunger is positioned at the upper stack end of the slit disc stack such that the lower end of the plunger is centered with respect to a central bore of the slit disc stack.

Turning to operation 506, the cyclic disc-deformation structure is collapsed. In response to being collapsed, the cyclic disc-deformation structure applies a force on to the plunger so as to trigger the actuated position at operation 508. In response to triggering the actuated position, the plunger is stroked through the slit disc stack to alternately deflect and undeflect slit discs at operation 510. Accordingly, one or more of the slit discs included in the slit disc stack are cyclically deformed, i.e., cyclically deflected and undeflected. At operation 512, the alternately deflected and undeflected slit discs dissipate the energy from the stroked plunger and the method ends at operation 514.

The energy absorption system 10 described herein can be packaged in various applications, such as helicopter seating systems with the vehicle seat 13 being arranged in telescopic tubes of the buckets of the seating systems and the cyclic disc-deformation structure(s) accommodated in fixed bases.

The cyclic disc-deformation structure 20 described herein as having varying stiffness based energy attenuation capabilities for use in an energy absorption system 10 may significantly lower stroke length and weight as compared to existing wire bender designs and can be altered or customized for particular instances. In addition, in an event the cyclic disc-deformation structure 20 is produced using additive manufacturing techniques, performance characteristics thereof could be made predictable and consistent.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A vehicle comprising:
 a housing;
 a vehicle seat disposed in the housing; and
 at least one radial slit disc energy attenuation assembly configured for installation with the vehicle seat, the at least one radial slit disc energy attenuation assembly, the at least one radial slit disc energy attenuation assembly including an upper end coupled to the vehicle seat and a lower end coupled the housing, the at least one radial slit disc energy attenuation assembly including a slit disc stack having a plurality of deflectable discs configured to deflect in response to realizing a force applied by the vehicle seat, the plurality of deflectable discs comprising a plurality of slit discs and a plurality of spacer discs, the plurality of slit discs and the plurality of spacer discs vertically stacked in an alternating arrangement with respect to one another,
 wherein the slit disc stack extends along a central axis (A) from a lower stack end to an upper stack end to define a stack height,
 wherein the at least one radial slit disc energy attenuation assembly further includes a plunger extending from an upper end to a lower end, the lower end positioned proximate to the upper stack end and configured to penetrate the slit disc stack in response to receiving the collapsing force applied by the vehicle seat,
 wherein the plunger includes a series of alternating series of ridges and furrows extending parallel to the central axis (A) from the upper end to the lower end to define a corrugated body, and
 wherein in response to penetrating the slit disc stack, energy is transferred to at least one deflected slit disc and is dissipated within the slit disc stack.

2. The vehicle of claim 1, wherein an individual spacer disc is interposed directly between each opposing pairs of slit discs included in the slit disc stack to define a gap between the pair of opposing slit discs.

3. The vehicle of claim 2, wherein each slit disc includes a plurality of slits extending radially from a central opening toward the outer edge.

4. The vehicle of claim 3, wherein the plurality of slits defines individual flexible sectors configured to deflect.

5. The vehicle of claim 4, wherein each spacer disc has an annular-shaped body that extends circumferentially about the central axis (A) to define an inner void configured to receive a portion of a deflected flexible sector.

6. A radial slit disc energy attenuation assembly configured for installation with a vehicle seat, comprising:
 a slit disc stack extending along a central axis (A) from a lower stack end to an upper stack end to define a stack height, the slit disc stack including a plurality of slit discs and a plurality of spacer discs, the plurality of slit discs and the plurality of spacer discs vertically stacked in an alternating arrangement with respect to one another; and
 a plunger extending from an upper end to a lower end, the lower end positioned proximate to the upper stack end and configured to penetrate the slit disc stack in response to receiving an applied force,
 wherein the plunger includes a series of alternating series of ridges and furrows extending parallel to the central axis (A) from the upper end to the lower end to define a corrugated body, and
 wherein in response to penetrating the slit disc stack, energy is transferred to at least one deflected slit disc and is dissipated within the slit disc stack.

7. The radial slit disc energy attenuation assembly of claim 6, wherein an individual spacer disc is interposed directly between each opposing pairs of slit discs included in the slit disc stack to define a gap between the pair of opposing slit discs.

8. The radial slit disc energy attenuation assembly of claim 7, wherein each slit disc includes a plurality of slits extending radially from a central opening toward the outer edge.

9. The radial slit disc energy attenuation assembly of claim 8, wherein the plurality of slits defines individual flexible sectors configured to deflect.

10. The radial slit disc energy attenuation assembly of claim 9, wherein each spacer disc has an annular-shaped body that extends circumferentially about the central axis (A) to define an inner void configured to receive a portion of a deflected flexible sector.

11. The radial slit disc energy attenuation assembly of claim 1, wherein each furrow has a first diameter and each ridge has a second diameter that is greater than the first diameter.

12. A method of dissipating energy, the method comprising:
 stacking a plurality of slit discs and spacer discs in an alternating arrangement along a central axis (A) from a lower stack end to an upper stack end to define a slit disc stack and configured for installation with a vehicle seat;
 positioning a plunger at the upper stack end during a non-actuated position, the plunger including a series of alternating series of ridges and furrows extending parallel to the central axis (A) from the upper end to the lower end to define a corrugated body; and
 applying a force to the plunger in response to collapsing a cyclic disc-deformation structure; and
 transferring energy delivered from the plunger to the slit disc stack so as to dissipate the energy.

13. The method of claim 12, wherein transferring the energy comprises stroking the plunger into the slit disc stack to deflect at least one slit discs.

14. The method of claim 13, wherein deflecting the at least one slit disc dissipates the energy delivered from the plunger.

15. The method of claim 14, wherein deflecting the at least one slit disc comprises deflecting individual flexible sectors of the at least one slit disc into a gap defined by a proximate spacer disc.

16. The method of claim 15, wherein stroking the plunger into the slit disc stack comprises a series of entries and exits through the at least one slit disc so to pulsate the force applied to the at least one slit disc.

* * * * *